W. E. R. RADEMAKER.
VIBRATING SELF INTERRUPTER FOR ELECTRIC BELLS, &c.
APPLICATION FILED FEB. 15, 1916.
1,242,038.
Patented Oct. 2, 1917.
2 SHEETS—SHEET 1.
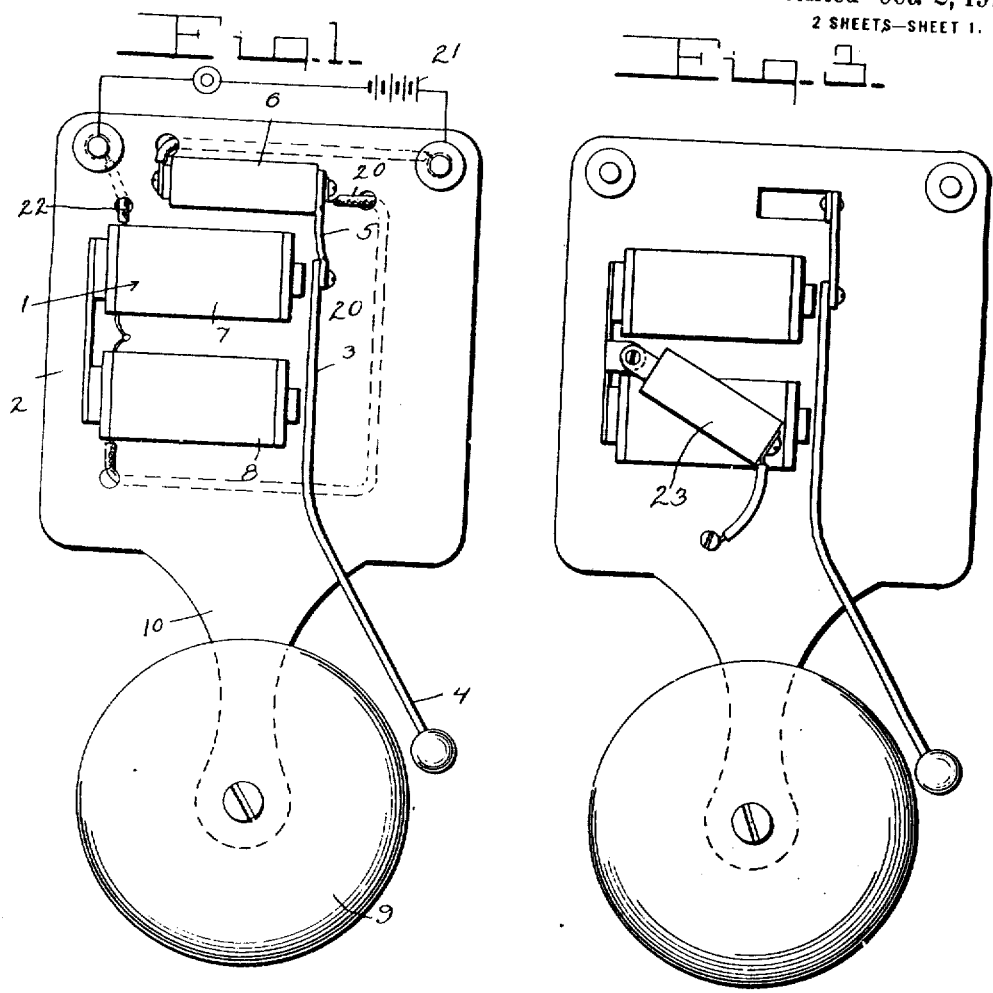
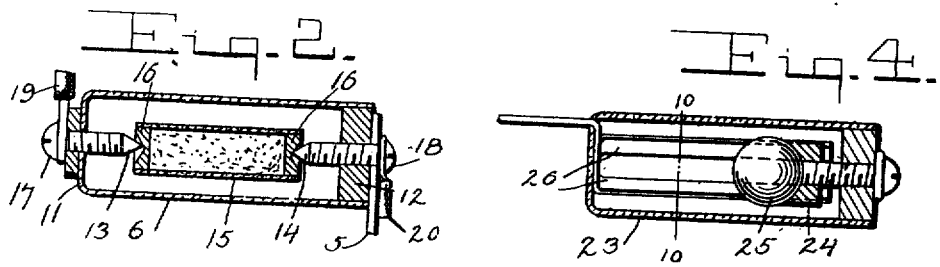
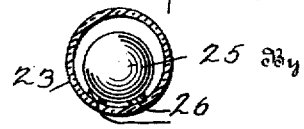
Witnesses
Inventor
W. E. R. Rademaker W. E. R. RADEMAKER.
VIBRATING SELF INTERRUPTER FOR ELECTRIC BELLS, &c.
APPLICATION FILED FEB. 15, 1916.
1,242,038.
Patented Oct. 2, 1917.
2 SHEETS—SHEET 2.
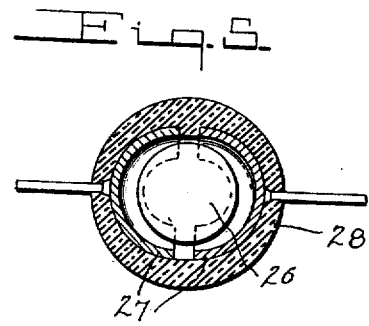
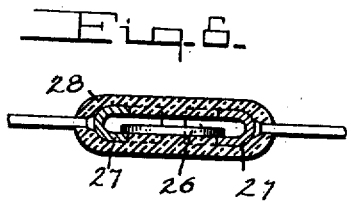
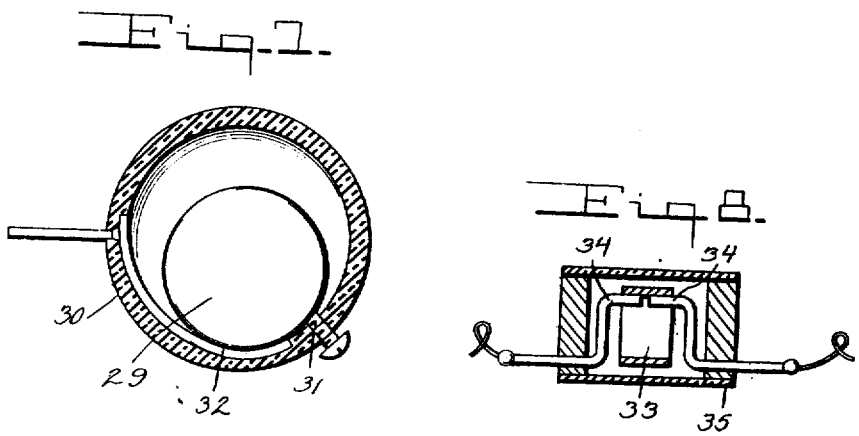
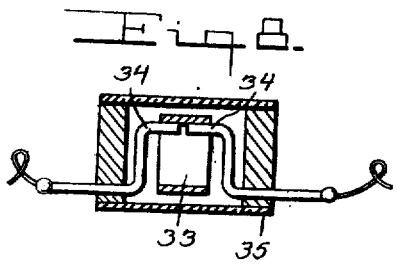
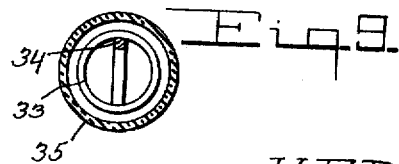
Witnesses
Inventor
W. E. R. Rademaker
By
Attorney

UNITED STATES PATENT OFFICE.

WILLIAM E. R. RADEMAKER, OF HOBOKEN, NEW JERSEY.

VIBRATING SELF-INTERRUPTER FOR ELECTRIC BELLS, &c.

1,242,038.  Specification of Letters Patent.  Patented Oct. 2, 1917.

Application filed February 15, 1916. Serial No. 78,453.

*To all whom it may concern:*

Be it known that I, WILLIAM E. R. RADEMAKER, a citizen of the United States, residing at Hoboken, in the county of Hudson and State of New Jersey, have invented certain new and useful Improvements in Vibrating Self-Interrupters for Electric Bells, &c.; and I do hereby declare the following to be a full, clear, and exact description of the invention, such as will enable others skilled in the art to which it appertains to make and use the same.

The invention relates to a vibrating self-interrupter for electric bells, induction coils and other electrical devices.

The object of the present invention is to provide a simple, practical and effiecient self-interrupter for electric bells, induction coils and other electrical apparatus requiring an interrupter and to eliminate the contact screw from such devices and the troubles frequently resulting from the use of such screw especially when the same is exposed to the atmosphere and is subject to corrosion, rust, dust, insects, sleet, bad adjustment, burning away of the contact points, fusion, etc.

A further object of the invention is to provide an interrupter of this character equipped with hermetically sealed contacts with no mechanical connection from the exterior and working without any exposed sparks whereby it is especially adapted for operation in storage battery rooms, factories, mines, laboratories, submarines where an exposed spark is liable to cause an explosion.

It is also an object of the invention to provide an absolutely fool proof interrupter adapted to increase the efficiency of electric bells, buzzers and the like and capable of enabling the stroke of the same to be controlled whereby the device will be especially advantageous in slow stroke bells and gongs.

Furthermore, the invention has for its object to enable the armature of an electric bell, buzzer or the like to be attracted and operated by all the magnetic force developed by the magnets by effecting a breaking or opening of the circuit after the armature has moved into actual contact with the core or cores of the magnets or substantially so.

With these and other objects in view the invention consists in the construction and novel combination and arrangement of parts hereinafter fully described, illustrated in the accompanying drawings and pointed out in the claims hereto appended, it being understood that various changes in the form, proportion and minor details of construction may be resorted to without departing from the spirit or sacrificing any of the advantages of the invention.

In the drawings

Figure 1 is a plan view of an electric bell equipped with an interrupter constructed in accordance with this invention, Fig. 2 is an enlarged longitudinal sectional view of the vibratory interrupter, Fig. 3 is an elevation of a bell provided with a vibrator illustrating another form of the invention, Fig. 4 is a sectional view of the same, Figs. 5 and 6 are detail sectional views illustrating another form of the invention in which a disk is supported in recesses of spaced approximately U-shaped contacts.

Fig. 7 is a sectional view showing another form of interrupter employing a movable disk, Fig. 8 is a longitudinal sectional view of the interrupter embodying a ring supported loosely upon spaced contacts, Fig. 9 is a transverse sectional view of the same.

Fig. 10 is a sectional view on line 10—10 of Fig. 4.

Like numerals of reference designate corresponding parts in the several figures of the drawings.

In the accompanying drawings in which is illustrated the preferred embodiment of the invention, the device illustrated in Figs. 1 and 2 of the drawings comprises an electric bell including an electromagnet 1 mounted on a base plate 2 and arranged to attract an armature 3 carrying a bell hammer 4 and provided with a resilient arm or spring 5 which is suitably secured to the casing 6 of an interrupter which is mounted on the bracket or base plate 2 above the electromagnet 1. The electromagnet 1 is shown consisting of a pair of coils 7 and cores 8 projecting from one end of the coils which are disposed in a horizontal position. The armature 3 is approximately vertical and the bell hammer 4 is arranged to engage a metallic bell 9 suitably connected with the bracket or base plate 2 preferably by being mounted on a depending arm 10 thereof.

The interrupter comprises a casing 6 of suitable material preferably of cylindrical form but the casing may be of any other desired configuration as will be readily understood. The casing 6 which is preferably provided with an end wall 11 has its other end closed by a plug 12 whereby the casing is adapted to be hermetically sealed to prevent the atmospheric air from affecting spaced contacts 13 and 14. The contacts which may be of any suitable material are arranged horizontally and project into a hollow tubular or cylindrical conductor supported in spaced relation with the walls of the casing by the projecting contacts 13 and 14 and constructed of suitable material such as metal, carbon, or the like. The hollow conductor 15 is preferably provided with interiorly arranged rings or recessed disks 16 spaced from the ends of the conductor and designed to be constructed of suitable material such as silver or carbon. In practice the hollow tubular conductor will be constructed of brass or some other suitable material of high conductivity and the contacts will be of silver, carbon or other suitable material. The contacts 13 and 14 consist of projecting portions carried by suitable supports preferably in the form of screws 17 and 18 with which wires 19 and 20 are connected and one of the screws, viz., the screw 20 may be advantageously employed for mounting the resilient arm 5 of the armature on the vibratory interrupter. The wire 20 is connected with one of the terminals of the coils and the other wire 19 extends to the battery or other suitable source of current supply 21 which is connected with the other terminal of the coils of the electromagnet by a wire 22. When the current flows through the circuit by reason of the closing thereof by a push button or other suitable means the magnet is energized and it attracts the armature which is attracted by the full magnetic force developed by the electromagnet and the bell hammer 4 is caused to strike the bell 9. The jar or vibration incident to the operation of the armature and the striking of the bell causes the tubular conductor 15 to be jarred out of contact with the spaced projecting contact points 13 and 14 whereby the current is interrupted by the breaking of the circuits. The armature will then be moved away from the electromagnets under the influence of the resilient arm or spring 5 and the circuit will be again closed by the tubular conductor or contact member again contacting with the spaced contact points 13 and 14. While the vibratory self-interrupting device is shown mounted on the upper portion of the bracket or base plate 2 and forming a supporting for the spring or resilient arm 5 of the armature 3, the armature spring may be mounted in any other desired manner, and the vibrating self-interrupting device may be arranged at any other desired point on the electric bell as the vibration of the electrical device due to the operation of the same will be sufficient to throw the tubular contact member out of electrical engagement of contact with the points 13 and 14 and the interrupter will operate to make and break the circuit and produce a continuous operation of the bell as long as the current flows. While the vibrating self-interrupting device is shown applied to an electric bell it is apparent that it may be used on induction coils, buzzers and various other electrical devices having sufficient vibration to cause an operation of the interrupter. As the contact points and the movable contact member may be hermetically sealed within the casing 6 and have no mechanical connection with the exterior of the casing there will be no exposed spark and the interrupter may be used with perfect safety in various places where a sparking might result in an explosion or fire.

In Figs. 3 and 4 of the drawings is illustrated another form of interrupter comprising an inclined adjustably mounted casing 23 provided at its lower end with a contact 24 with which contacts a movable ball 25. The ball 25 which may be constructed of any suitable material rolls along a conductor 26 preferably consisting of a pair of spaced metallic strips as described in Patent #1,172,047 granted to me Feb. 15, 1916. The inclined casing may be arranged at different angles or inclinations for controlling the return of the ball to the contact 24 and the action of the interrupter and the operation of the electric bell or other electrical device may be controlled in this manner and the frequency thereof varied.

In Figs. 5 and 6 is illustrated another form of the invention in which the interrupter comprises a movable disk 26 of metal, carbon or other suitable material supported by spaced approximately U-shaped contacts 27 and arranged within a suitable casing 28. The vibratory movement of the electrical device on which the interrupter shown in Figs. 5 and 6 may be mounted will cause the disk to move out of contact with one or the other of the contacts 27 and thereby make and break the current.

In the form of the interrupter shown in Fig. 7 of the drawings, a disk 29 is arranged within a circular casing 30 of greater diameter than the disk which is adapted to be thrown out of electrical contact with a contact point 31. The disk is arranged upon a conductor 32 and the circuit is closed when the disk is in electrical contact with the contact point 31.

In Figs. 8 and 9 of the drawings is illustrated an interrupter comprising a contact member 33 consisting of a ring and supported by spaced contact points 34 mounted within a casing 35. The contact points 34 and the annular contact member 33 are designed to be constructed of suitable material and the annular contact member is thrown out of electrical contact with the point 34 by the vibration of an electric bell or other device. Various other forms of interrupters may, as will be readily understood, be employed for utilizing the vibration of the electric bell or other device due to the movement of the armature toward the core for making and breaking the current and the vibrating self-interrupting device may be employed in connection with any device utilizing an interrupted current and having sufficient vibration to operate the interrupter.

What is claimed is:—

1. A vibrating self-interrupter including relatively fixed and movable contacts, the movable contact lightly resting upon and supported by the fixed contacts and adapted to be jarred out of such contacts by the mechanical jar or vibration of the device with which the interrupter is used.

2. The combination with a device subject to vibration, upon closing of a circuit, of an interrupter including relatively fixed and movable contacts, the relatively fixed contacts being spaced apart and the relatively movable contact lightly resting upon and being supported wholly by the relatively fixed contacts and adapted to be jarred out of contact with the same by the mechanical jar or vibration of the device.

3. The combination with a device subject to jar or vibration, upon the opening or closing of a circuit, of an interrupter including spaced relatively fixed contacts and a conductor member constituting a movable contact and lightly resting upon and wholly supported by the spaced contacts whereby it is adapted to be jarred out of contact with the fixed contacts by the mechanical jar or vibration of the device.

4. A vibrating self-interrupter including spaced contact points and a contact member having recesses at the ends to receive and be supported by the said points and adapted to be thrown out of electrical contact with the same by the vibration of the device with which the interrupter is to be used.

5. A vibrating interrupter including a casing heremetically sealed and provided with relatively fixed contacts contained within the said casing and a relatively movable automatically closable contact also located within the casing and lightly resting upon and supported by the relatively fixed contacts, whereby the relatively movable contact is adapted to be jarred out of electrical contact with the fixed contacts solely by the mechanical jar or vibration of the said device.

6. A vibrating interrupter including a casing spaced contact points arranged within the casing and a contact member of annular form having end recesses to receive and be supported by the spaced contact points and adapted to be jarred out of electrical contact with the same by the vibration of the device with which the interrupter is to be used.

7. The combination with an electromagnet of an armature arranged to be attracted by the same, an interrupter including a casing and having relatively movable contacts, a spring connecting the armature with the casing whereby the contacts will be jarred out of electrical contact by the blows of the armature.

8. The combination with an electromagnet of an armature arranged to be attracted by the same, an interrupter including a casing and having relatively movable contacts, a spring connecting the armature with the casing whereby the contacts will be jarred out of electrical contact by the blows of the armature, a bell and a hammer carried by the armature and arranged to engage the bell.

In testimony whereof I affix my signature in presence of two witnesses.

WILLIAM E. R. RADEMAKER.

Witnesses:
 LEO MAYER,
 LOUIS J. MAYER.

Copies of this patent may be obtained for five cents each, by addressing the "Commissioner of Patents, Washington, D. C."